United States Patent Office 2,737,520
Patented Mar. 6, 1956

2,737,520

DEHYDROCHLORINATION OF POLYCHLORO-ALKYL CHLOROSILANES EMPLOYING DI-ALKYLAMINES AS CATALYSTS

George H. Wagner, Clarence, N. Y., assignor to Union Carbide and Carbon Corporation, a corporation of New York No Drawing. Application June 28, 1954,
Serial No. 439,891

6 Claims. (Cl. 260—448.2)

This invention relates to a process for preparing chloroalkenyl chlorosilanes from polychloroalkyl chlorosilanes. More particularly, the invention relates to an improved method for dehydrochlorinating chloroalkyl chlorosilanes whereby chloroalkenyl chlorosilanes are prepared at higher production rates, in purer form and in greater yields than by any method known heretofore.

The polychloroalkyl chlorosilanes suitable as starting materials in the preparation of chloroalkenyl chlorosilanes are those which contain a single chlorine atom bonded to the beta carbon atom of the polychloroalkyl substituent group and a single chlorine atom bonded to an adjacent carbon atom, of said group. Typical of the chloroalkyl chlorosilanes which may be dehydrochlorinated in accordance with the instant invention are alpha, beta-dichloroethyl trichlorosilane; alpha, beta-dichloropropyl trichlorosilane; beta, gamma-dichloropropyl trichlorosilane; alpha, beta-dichloroethyl ethyl dichlorosilane; alpha, beta-dichloroethyl diethyl monochlorosilane and the like.

The removal of hydrogen chloride from chloroalkyl chlorosilanes is ordinarily accomplished by reacting the latter compounds with bases, for example the tertiary amines such as quinoline or picoline in an amount chemically equivalent to, or in excess of, the hydrogen chloride to be removed. Such reactions may be illustrated by the following equation representing the dehydrochlorination of alpha, beta-dichloroethyl trichlorosilane:

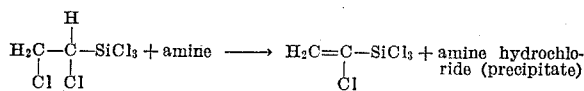

The known processes of this type relating to the removal of hydrogen chloride from chloroalkyl chlorosilanes, particularly dichloroalkyl chlorosilanes are attended with certain serious disadvantages. For example, the use of excess or even theoretical quantities of the required bases is almost prohibitive in cost from the commercial standpoint. Moreover, the products from such reactions have been impure and the yields low due to the high production of by-products and resinous materials. In addition it has been found that the use of excess or even theoretical quantities of the required bases creates difficulties in handling the separation of the desired chloroalkenyl chlorosilane product from the amine hydrochloride product. This is particularly true in operations wherein large quantities of chloroalkyl chlorosilanes are dehydrochlorinated.

The present invention provides a method whereby chloroalkenyl chlorosilanes may be produced in a pure state at production rates far greater than any obtainable heretofore and wherein the formation of appreciable amounts of by-products or resinous materials is avoided.

In accordance with the present invention chloroalkyl chlorosilanes containing a single chlorine atom bonded to the beta carbon atom of the chloroalkyl substituent group and a chlorine atom bonded to an adjacent carbon atom in said group are dehydrochlorinated by heating said compounds in the presence of small amounts of a dialkyl amine or a dialkyl amine salt at temperatures of from about 160° C. to about 210° C., and generally under reflux conditions, to evolve hydrogen chloride and removing the evolved hydrogen chloride from the reaction zone.

As the starting materials employed in the process contain in the chloroalkyl substituent group a single chlorine atom bonded to the beta carbon atom of said group and another chlorine atom bonded to an adjacent carbon atom of said group, dehydrochlorination results in the preparation of compounds containing an olefinic unsaturation between the alpha and beta carbon atoms or between the beta and gamma carbon atoms of such substituent group. These products will also generally have a chlorine atom bonded to a carbon atom exhibiting the olefinic linkage. Thus for example, in the dehydrochlorination of alpha, beta-dichloroethyl trichlorosilane by my process there is obtained alpha-chlorovinyl trichlorosilane. Likewise in the dehydrochlorination of alpha, beta-dichloropropyl trichlorosilane there is obtained 1-chloro-1-propenyl trichlorosilane.

When dehydrochlorinating compounds containing chlorine atoms in the beta and gamma positions of the chloroalkyl substituent group such as beta, gamma-dichloropropyl trichlorosilane there is obtained a mixture of 3-chloro-1-propenyl trichlorosilane and 3-chloro-2-propenyl trichlorosilane. Dehydrochlorination of chloroalkyl chlorosilanes containing one or two alkyl groups bonded to the silicon atom of the compound in place of one or two of the chlorine atom is conducted in the identical manner disclosed above, such alkyl groups do not effect the course of the reaction nor are they affected by it.

Dialkyl amines suitable for use in the process include such compounds as dimethyl amine, diethyl amine, dipropyl amine, diisopropyl amine and the like. As indicated above the salts of such dialkyl amines may also be employed, the preferred salts are the hydrochloride salts of the dialkyl amines. In general, the amine compounds may be employed in the process of this invention in an amount of from about 1 per cent to about 20 per cent by weight of the chlorosilane and preferably they are employed in an amount by weight of from about 1 per cent to about 5 per cent. When the hydrochloride salts of the above amines are employed slightly greater amounts thereof are required.

The mechanism of the process of the invention whereby less than theoretical amounts of the dialkyl amines or their salts may be employed to effect dehydrochlorination of the chloroalkyl chlorosilanes is not clearly understood. However, the reaction may be illustrated by the following equation representing the dehydrochlorination of alpha, beta-dichloroethyl trichlorosilane:

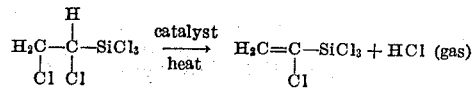

where the catalyst is a dialkyl amine or the hydrochloride salt of such amine.

Those conditions defined above with respect to temperature and dialkyl amine concentrations under which dichloroalkyl chlorosilanes are dehydrochlorinated are critical for effective operation of the process. Specifically if the process is conducted at temperatures below about 160° C. dehydrochlorination does not take place. If, on the other hand, the process is conducted at temperatures above about 210° C. relatively small yields of the chloroalkenyl chlorosilanes are obtained. The latter result is attributable to the fact that at such higher temperatures side reactions between the chloroalkyl chlorosilanes and the dialkyl amines take place and not only result in the preparation of undesirable products but also in destroying the effectiveness of the dialkyl amines for the purposes of dehydrochlorination.

With respect to the amount of the dialkyl amines and their salts which are employed it has been found that concentrations thereof above about 20 per cent by weight are not conducive to the effective operations of the process. For example, when employing such compounds in higher concentrations in dehydrochlorinations conducted under reflux conditions, sublimation of amine residues occur and crystalline white solids are found in the distilling column. On the other hand, the use of the compounds in concentrations above about 20 per cent by weight when conducting the dehydrochlorination without reflux, that is by only applying heat, difficulties arise in the separation of the catalyst from the chloroalkenyl chlorosilane product.

One method of conducting the process of the invention involves charging a chloroalkyl chlorosilane such as alpha, beta-dichloroethyl trichlorosilane and an appropriate amount of a dialkyl amine such as diethyl amine to a flask connected to a distilling column and heating the mixture to a temperature within the range disclosed above. Hydrogen chloride gas is evolved from the reaction mixture, passes through the column and is vented at the head of the column and may be recovered as a valuable product of the reaction. Heating of the mixture is continued until the evolution of hydrogen chloride ceases. After heating there remains in the flask for the specific instance referred to a mixture comprising essentially alpha-chlorovinyl trichlorosilane with small amounts of diethyl amine and diethyl amine hydrochloride. Alpha-chlorovinyl trichlorosilane may be readily separated from the mixture and the remaining portion comprising diethyl amine and diethyl amine hydrochloride employed for another reaction procedure.

The preferred embodiment of the invention comprises conducting the reaction under reflux conditions and providing for the removal of the products of the reaction in a single operation. This is possible as the chloroalkenyl chlorosilane product normally has a boiling point below the reflux temperature of the reaction mixture. In the practice of this embodiment of the invention the reaction may be conducted by heating a dichloroalkyl chlorosilane and a dialkyl amine or its hydrochloride to reflux in a flask connected to a distilling column provided with a still head and receiver. Shortly after reflux conditions are established the gaseous products of the reaction mixture pass to the still head where the hydrogen chloride product is vented to a hood and the gaseous chlorosilane product condensed and passed to a receiver. If desired only a portion of the chlorosilane product obtained at the still head may be passed to the receiver with the remaining portion returned to the column. By conducting the reaction in this manner the process may be made continuous by providing means for the controlled addition of the dichloroalkyl chlorosilane to the reaction mixture at a rate equal to that at which the products are collected. In this manner small amounts of the dialkyl amine or dialkyl amine salt may be employed to dehydrochlorinate large quantities of dichloroalkyl chlorosilanes.

The following example is illustrative of the invention:

*Example*

To a round bottom flask connected to a distilling column packed 12 inches of its length with ⅛ inch glass helices and equipped with a still head and receiver were charged 195 grams of alpha, beta-dichloroethyl trichlorosilane and 2 grams of diethyl amine hydrochloride. The mixture was heated to reflux (flask temperature approximately 170° C.–180° C.). Shortly after reflux conditions were established the gaseous products of the reaction passed to the still head with the hydrogen chloride product vented to a hood and only a portion of the condensed alpha-chlorovinyl trichlorosilane product collected in the receiver with the remaining portion returned to the column. Heating was continued until the evolution of hydrogen chloride ceased. This reaction was completed within five hours and there was obtained 105 grams of alpha-chlorovinyl trichlorosilane, representing a yield of 80 mole per cent.

What is claimed is:

1. A process of dehydrochlorinating a polychloroalkyl chlorosilane in which only one of the chlorine atoms is bonded to the beta carbon atom of the polychloroalkyl group thereof with at least one chlorine atom bonded to a carbon atom adjacent to said beta carbon atom of said group, said polychloroalkyl chlorosilane being taken from the class consisting of: (a) polychloroalkyl chlorosilanes which contain only polychloroalkyl groups and chlorine atoms bonded to the silicon atom thereof, and (b) polychloroalkyl chlorosilanes which contain only polychloroalkyl groups, alkyl groups and chlorine atoms bonded to the silicon atom thereof, which comprises heating said polychloroalkyl chlorosilane with from about 1 per cent to about 20 per cent by weight of said polychloroalkyl chlorosilane of a dialkyl amine at a temperature of from about 160° C. to about 210° C. to evolve hydrogen chloride and removing said hydrogen chloride from the reaction mixture.

2. A process of dehydrochlorinating a polychloroalkyl chlorosilane in which only one of the chlorine atoms is bonded to the beta carbon atom of the polychloroalkyl group thereof with at least one chlorine atom bonded to a carbon atom adjacent to said beta carbon atom of said group, said polychloroalkyl chlorosilane being taken from the class consisting of: (a) polychloroalkyl chlorosilanes which contain only polychloroalkyl groups and chlorine atoms bonded to the silicon atom thereof, and (b) polychloroalkyl chlorosilanes which contain only polychloroalkyl groups, alkyl groups and chlorine atoms bonded to the silicon atoms thereof, which comprises heating said polychloroalkyl chlorosilane with from about 1 per cent to about 20 per cent by weight of said polychloroalkyl chlorosilane of a dialkyl amine at a temperature of from about 160° C. to about 210° C., under reflux conditions and removing hydrogen chloride and an unsaturated derivative of said chloroalkyl chlorosilane from the reaction mixture.

3. A process of dehydrochlorinating a polychloroalkyl chlorosilane in which only one of the chlorine atoms is bonded to the beta carbon atom of the polychloroalkyl group thereof with at least one chlorine atom bonded to a carbon atom adjacent to said beta carbon atom of said group, said polychloroalkyl chlorosilane being taken from the class consisting of: (a) polychloroalkyl chlorosilanes which contain only polychloroalkyl groups and chlorine atoms bonded to the silicon atom thereof, and (b) polychloroalkyl chlorosilanes which contain only polychloroalkyl groups, alkyl groups and chlorine atoms bonded to the silicon atom thereof, which comprises heating said polychloroalkyl chlorosilane with from about 1 per cent to about 20 per cent by weight of said polychloroalkyl chlorosilane of a dialkylamine hydrochloride at a temperature of from about 160° C. to about 210° C. to evolve hydrogen chloride and removing said hydrogen chloride from the reaction mixture.

4. A process of dehydrochlorinating a polychloroalkyl chlorosilane in which only one of the chlorine atoms is bonded to the beta carbon atom of the polychloroalkyl group thereof with at least one chlorine atom bonded to a carbon atom adjacent to said beta carbon atom of said group, said polychloroalkyl chlorosilane being taken from the class consisting of: (a) polychloroalkyl chlorosilanes which contain only polychloroalkyl groups and chlorine atoms bonded to the silicon atom thereof, and (b) polychloroalkyl chlorosilanes which contain only polychloroalkyl groups, alkyl groups and chlorine atoms bonded to the silicon atom thereof, which comprises heating said polychloroalkyl chlorosilane with from about 1 per cent to about 20 per cent by weight of said polychloroalkyl chlorosilane of a dialkylamine hydrochloride at a temperature of from about 160° C. to about 210°

C., under reflux conditions and removing hydrogen chloride and an unsaturated derivative of said chloroalkyl chlorosilane from the reaction mixture.

5. Process of dehydrochlorinating alpha, beta-dichloroethyl trichlorosilane which comprises heating said alpha, beta-dichloroethyl trichlorosilane with from about 1 per cent to about 20 per cent by weight of said trichlorosilane of diethyl amine at a temperature of from about 160° C. to about 210° C. under reflux conditions to evolve hydrogen chloride from the reaction mixture.

6. A process of dehydrochlorinating alpha, beta-dichloroethyl trichlorosilane which comprises heating said alpha, beta-dichloroethyl trichlorosilane with from about 1 per cent to about 20 per cent by weight of said chlorosilane of diethyl amine hydrochloride at a temperature of from about 160° C. to about 210° C. under reflux conditions to remove hydrogen chloride and alpha-chlorovinyl trichlorosilane from the reaction mixture.

References Cited in the file of this patent

UNITED STATES PATENTS 2,512,390     Sommer _____ June 20, 1950

OTHER REFERENCES

Drake: "Jour. Am. Chem. Soc.," vol. 56 (1934), pages 1810–1812.

Agre et al. (1): "Jour. Am. Chem. Soc.," vol. 74 (1952), pages 3895–3898.

Agre et al. (2): "Jour. Am. Chem. Soc.," vol. 74 (1952), pages 3899–3902.